US010701319B2

United States Patent
Jurrius et al.

(10) Patent No.: US 10,701,319 B2
(45) Date of Patent: Jun. 30, 2020

(54) ENHANCED VIRTUAL AND/OR AUGMENTED COMMUNICATIONS INTERFACE

(71) Applicant: IntraCom Systems, LLC, Malibu, CA (US)

(72) Inventors: John Jurrius, Chapel Hill, NC (US); David Brand, Northridge, CA (US); Stephen Brand, Malibu, CA (US)

(73) Assignee: INTRACOM SYSTEMS, LLC, Malibu, CA (US)

(*) Notice: Subject to any disclaimer, the term of this patent is extended or adjusted under 35 U.S.C. 154(b) by 0 days.

(21) Appl. No.: 15/833,241

(22) Filed: Dec. 6, 2017

(65) Prior Publication Data

US 2018/0176511 A1  Jun. 21, 2018

Related U.S. Application Data

(60) Provisional application No. 62/436,892, filed on Dec. 20, 2016.

(51) Int. Cl.
| | |
|---|---|
| *H04N 7/15* | (2006.01) |
| *H04L 29/06* | (2006.01) |
| *G06F 3/01* | (2006.01) |
| *G10L 25/63* | (2013.01) |

(52) U.S. Cl.
CPC ......... *H04N 7/157* (2013.01); *H04L 65/1053* (2013.01); *H04L 65/403* (2013.01); *G06F 3/013* (2013.01); *G10L 25/63* (2013.01)

(58) Field of Classification Search
CPC ... H04N 7/157; H04L 65/1053; H04L 65/403; G10L 25/63; G06F 3/013
See application file for complete search history.

(56) References Cited

U.S. PATENT DOCUMENTS

| | | | | |
|---|---|---|---|---|
| 9,785,741 | B2 * | 10/2017 | Lenchner | G06F 19/20 |
| 2014/0241340 | A1 * | 8/2014 | Seligmann | H04M 9/003 370/352 |
| 2015/0215351 | A1 * | 7/2015 | Barzuza | G06T 19/006 715/757 |
| 2017/0127023 | A1 * | 5/2017 | High | H04N 7/157 |
| 2018/0137432 | A1 * | 5/2018 | Chen | G06N 99/005 |

* cited by examiner

*Primary Examiner* — Stella L. Woo
(74) *Attorney, Agent, or Firm* — Casimir Jones, S.C.; David Casimir

(57) ABSTRACT

The present invention provides systems and methods employing a conferencing system for facilitating enhanced communication between users. In certain embodiments, the conferencing system comprises a communication interface configured to, during a conference session, provide a virtual and/or augmented conference between multiple users having access to a multi-channel, multi-access, always-on, and non-blocking communication. In particular embodiments, the communication interface is in communication with at least one additional component select from: a video component, a data component (e.g., that provides non-audio data to one or more of said users), an audio/video ambience component, and a whiteboard component.

20 Claims, 1 Drawing Sheet

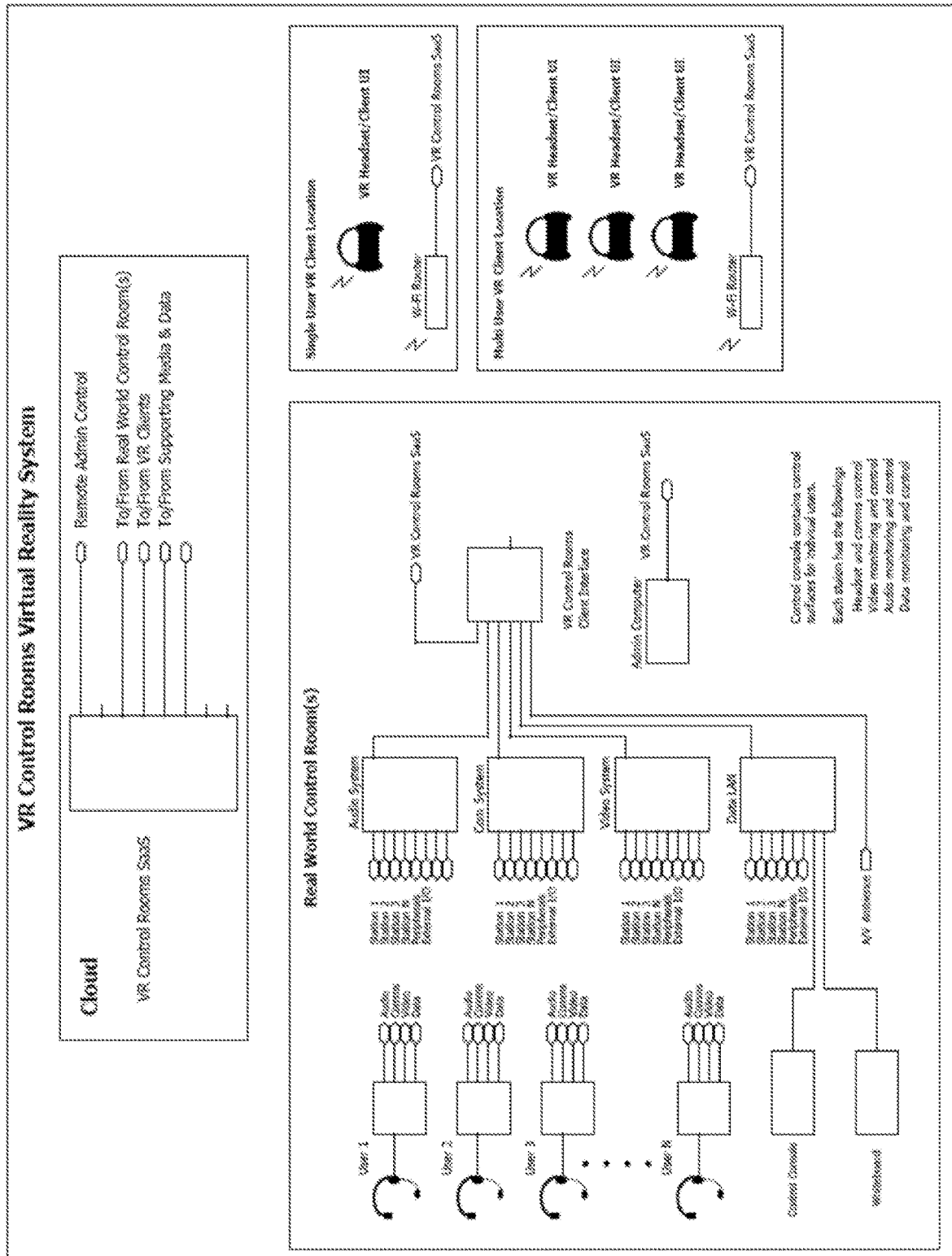

ENHANCED VIRTUAL AND/OR AUGMENTED COMMUNICATIONS INTERFACE

The present application claims priority to U.S. Provisional application Ser. No. 62/436,892, filed Dec. 20, 2016, which is herein incorporated by reference in its entirety.

FIELD OF THE INVENTION

The present invention provides systems and methods employing a conferencing system for facilitating enhanced communication between users. In certain embodiments, the conferencing system comprises a communication interface configured to, during a conference session, provide a virtual and/or augmented conference between multiple users having access to a multi-channel, multi-access, always-on, and non-blocking communication. In particular embodiments, the communication interface is in communication with at least one additional component selected from: a video component, a data component (e.g., that provides non-audio data to one or more of said users), an audio/video ambience component, and a whiteboard component.

BACKGROUND

According to the IDC total revenue for virtual reality and augmented reality is projected to increase from $5.2 billion in 2016 to over $162 billion by 2020. While initial market growth is being driven by entertainment and gaming, Deloitte Digital says the largest market opportunities lie within enterprises and the greatest level of adoption will be around collaboration and training applications. Teams that are not in the same physical environment will be able to enter virtual environments to exchange information and ideas in ways that surpass two dimensional video and conferencing. Virtualized reality collaboration will take how we communicate, share ideas and concepts to a completely new level. However, the underlying technology for maximizing the potential of virtualized or augmented reality collaboration is lacking.

SUMMARY OF THE INVENTION

The present invention provides systems and methods employing a conferencing system for facilitating enhanced communication between users. In certain embodiments, the conferencing system comprises a communication interface configured to, during a conference session, provide a virtual and/or augmented conference between multiple users having access to a multi-channel, multi-access, always-on, and non-blocking communication. In particular embodiments, the communication interface is in communication with at least one additional component select from: a video component, a data component (e.g., that provides non-audio data to one or more of said users), an audio/video ambience component, and a whiteboard component.

In some embodiments, provided herein is a conferencing system for facilitating enhanced communication between users, the conferencing system comprising: a communication interface configured to, during a conference session, provide a virtual and/or augmented conference between multiple users having access to a multi-channel, multi-access, always-on, and non-blocking communication. In certain embodiments, the communication interface is in communication with a video component that provides video to one or more of said users (e.g., allowing a 180 degree . . . 270 degree . . . or 360 degree video view for the user). In particular embodiments, the communication interface is in communication with a data component that provides non-audio data to one or more of said users (e.g., allowing a 180 degree . . . 270 degree . . . or 360 degree data view for the user). In some embodiments, the communication interface is in communication with an audio/video ambience component that provides audio/video to one or more of said users. In further embodiments, the communication interface is in communication with a whiteboard component that provides a whiteboard function to one or more of said users (e.g., allowing a 180 degree . . . 270 degree . . . or 360 degree whiteboard view for the user). In certain embodiments, the communication interface is configured to allow a user to navigate by swiping, pinching, zooming in, or zooming out on the content being viewed (e.g., the video, data presented, whiteboard, etc.).

In some embodiments, the communication interface is in communication with an audio analysis component that analyzes incoming human speech audio data for: i) substantive content and/or 2) human emotion content. In certain embodiments, the audio analysis component comprises artificial intelligence software and/or machine learning software. In further embodiments, the substantive content comprises situational context, wherein the situational context comprises at least one situation selected from the group consisting of: a medical emergency, a product or service complaint, a financial inquiry, a product or service order, a product or service review, a credit card inquiry, and a request to display a whiteboard. In further embodiments, the human emotion content comprises at least one human emotion selected from the group consisting of: distress, pain, anger, frustration, happiness, satisfaction, annoyance, and panicking.

In some embodiments, provided herein is a non-transitory computer readable storage media having instructions stored thereon that, when executed by a conferencing system, direct the conferencing system to perform a method for facilitating enhanced communication between users, the method comprising: during a conference session, providing a virtual and/or augmented conference with multi-channel, multi-access, always-on, and non-blocking communication between a plurality of users.

In some embodiments, provides herein are systems for generating a client communication interface for a conference session comprising: a) a computer processor, and b) non-transitory computer memory comprising one or more computer programs and a database, wherein said one or more computer programs comprises virtual and/or augmented reality client communication interface software, and wherein said one or more computer programs, in conjunction with said computer processor, is/are configured to generate a client communication interface for a conference session with a plurality of users by sending and receiving information from the following first components: i) a com system component, wherein said com system component is configured to, during a conference session, provide a multi-channel, multi-access, always-on, and non-blocking communication; ii) a video system component, wherein said video component provides video to said plurality of users; and iii) a data component, wherein said data component provides non-audio data to said plurality of users.

In particular embodiments, the one or more computer programs, in conjunction with said computer processor, is/are further configured to generate said client communication interface for a conference session with a plurality of users by sending and receiving information from at least one of the following second components: i) audio/video ambience component that provides audio/video to said plurality of users, and ii) a whiteboard component that provides a whiteboard function to said plurality of users. In certain embodiments, the virtual and/or augmented reality client communication interface software comprises centrally located SaaS software. In other embodiments, the SaaS software is hosted on the Internet (e.g., and the users log into the internet to access a client communication interface).

In some embodiments, provided herein are systems and methods for generating a client communications interface (e.g., a virtual reality/augmented reality communication interface) for users, such as for collaboration and/or training, which is generated by being in communication with a com component, wherein said com component enables complex, multi-channel voice collaboration, audio routing, and monitoring. In certain embodiments, provided herein are systems and methods for generating a client communication interface (e.g., for collaboration and/or training), that is in communication with at least two of the following components: 1) a com component (e.g., Matrix & PBX communications), which enables complex, multi-channel voice collaboration, audio routing, and monitoring, seamlessly integrated with standard PBX capabilities, and interoperable with communication systems outside VR; 2) a data LAN component for real-time telemetry data monitoring/interfacing; 3) a video system component, for multi-channel video monitoring/interfacing; 4) a control console component, providing a control surface, for controlling at least one of: lighting, audio switching, audio mixing consoles, video switching, and local or remote audio and video sources, local and remote telemetry data, and more from an intuitive UI; 5) a white board component for 3D white boarding, and 6) an audio system component for providing sound. In certain embodiments, at least three, at least four, a least five or all six of such components are in communication with the client communication interface. In some embodiments, one or both of the following additional components are in communication with the client communication interface: 6) an audio/visual ambience component that, for example, creates the feeling of "real life" application specific experiences, and/or 7) geo-positioning (e.g., 3D or 2D) and mapping component.

As used herein the terms "processor" and "central processing unit" or "CPU" are used interchangeably and refer to a device that is able to read a program from a computer memory (e.g., ROM or other computer memory) and perform a set of steps according to the program.

As used herein, the terms "computer memory" and "computer memory device" refer to any storage media readable by a computer processor. Examples of computer memory include, but are not limited to, RAM, ROM, computer chips, digital video disc (DVDs), compact discs (CDs), hard disk drives (HDD), and magnetic tape.

As used herein, the term "computer readable medium" refers to any device or system for storing and providing information (e.g., data and instructions) to a computer processor. Examples of computer readable media include, but are not limited to, DVDs, CDs, hard disk drives, magnetic tape and servers for streaming media over networks.

As used herein the terms "multimedia information" and "media information" are used interchangeably to refer to information (e.g., digitized and analog information) encoding or representing audio, video, and/or text. Multimedia information may further carry information not corresponding to audio or video. Multimedia information may be transmitted from one location or device to a second location or device by methods including, but not limited to, electrical, optical, and satellite transmission, and the like.

As used herein the term "audio information" refers to information (e.g., digitized and analog information) encoding or representing audio. For example, audio information may comprise encoded spoken language with or without additional audio. Audio information includes, but is not limited to, audio captured by a microphone and synthesized audio (e.g., computer generated digital audio).

As used herein the term "video information" refers to information (e.g., digitized and analog information) encoding or representing video. Video information includes, but is not limited to video captured by a video camera, images captured by a camera, and synthetic video (e.g., computer generated digital video).

As used herein the term "text information" refers to information (e.g., analog or digital information) encoding or representing written language or other material capable of being represented in text format (e.g., corresponding to spoken audio).

As used herein the term "configured to receive multimedia information" refers to a device that is capable of receiving multimedia information. Such devices contain one or more components that can receive signal carrying multimedia information.

As used herein the term "encode" refers to the process of converting one type of information or signal into a different type of information or signal to, for example, facilitate the transmission and/or interpretability of the information or signal. For example, audio sound waves can be converted into (i.e., encoded into) electrical or digital information.

As used herein the term "in electronic communication" refers to electrical devices (e.g., computers, processors, conference bridges, communications equipment) that are configured to communicate with one another through direct or indirect signaling. For example, a conference bridge that is connected to a processor through a cable or wire, such that information can pass between the conference bridge and the processor, are in electronic communication with one another. Likewise, a computer configured to transmit (e.g., through cables, wires, infrared signals, telephone lines, etc) information to another computer or device, is in electronic communication with the other computer or device.

As used herein the term "transmitting" refers to the movement of information (e.g., data) from one location to another (e.g., from one device to another) using any suitable means.

DESCRIPTION OF THE DRAWING

FIG. 1 shows an exemplary system architecture for generating a client communication interface, that is in communication with a number of systems (e.g., audio system, com system, video system, data LAN), that is hosted by a virtual and/or augmented control room Saas software, and that can be linked to any given number of users (e.g., so that they may participate in a virtual and/or augmented reality conference together by, for example, wearing a VR headset that provides a visual and audio depiction of the client communication interface).

DETAILED DESCRIPTION OF THE INVENTION

The present invention provides systems and methods employing a conferencing system for facilitating enhanced communication between users. In certain embodiments, the conferencing system comprises a communication interface configured to, during a conference session, provide a virtual and/or augmented conference between multiple users having access to a multi-channel, multi-access, always-on, and non-blocking communication. In particular embodiments, the communication interface is in communication with at least one additional component select from: a video component, a data component (e.g., that provides non-audio data to one or more of said users), an audio/video ambience component, and a whiteboard component.

In some embodiments, provided herein are systems and methods for generating a client communications interface (e.g., a virtual reality/augmented reality communication interface) for users, such as collaboration and/or training, which is in communication with a com component, wherein said com component enables complex, multi-channel voice collaboration, audio routing, and monitoring. In certain embodiments, provided herein are systems and methods for generating a client communication interface that is in communication with at least two of the following components: 1) a com component (e.g., Matrix & PBX communications), which enables complex, multi-channel voice collaboration, audio routing, and monitoring, seamlessly integrated with standard PBX capabilities, and interoperable with communication systems outside VR; 2) a data LAN component for real-time telemetry data monitoring/interfacing; 3) a video system component, for multi-channel video monitoring/interfacing; 4) a control console component, providing a control surface, for controlling at least one of: lighting, audio switching, audio mixing consoles, video switching, and local or remote audio and video sources, local and remote telemetry data, and more from an intuitive UI; 5) a white board component for 3D white boarding, and 6) an audio system component for providing sound. In certain embodiments, at least three, at least four, a least five or all six of such components are provided together in communication with the client the communications interface. In some embodiments, one or both of the following additional components are provided in communication the communications interface: 6) an audio/visual ambience component that, for example, creates the feeling of "real life" application specific experiences, and/or 7) geo-positioning (e.g., 2D or 3D) and mapping component.

In particular embodiments, the com component (e.g., a Matrix & PBX communications component) enables multi-channel, multi-access, always-on, non-blocking communications between users, meaning anyone can listen and/or speak to one or more users, in any complexity and without limitation. Such a component, in certain embodiments, enables audio routing, monitoring of virtually unlimited audio channels, and interfacing with source feeds via four-wire audio or SIP. Moreover, this component, in certain embodiments, incorporates an integrated, fully functional SIP PBX, to add all standard PBX capabilities, and enable seamless communications between matrix and PBX users. In certain embodiments, a gaze-to-talk (GTT) capability enables activation of voice or audio channels by looking or putting focus on (gazing) towards a selector, object, or form associated with any given channel. Depending on the VR platform and configuration, a "tap" or click of a game control button can latch the channel. The com component, in particular embodiments, is highly interoperable and readily interfaces with real world IP PBXs, hardware intercom systems, and two-way radios for seamless communications between VR control rooms, physical control rooms, and field operations.

In some embodiment, the data component is a real-time telemetry data monitoring/interfacing components that allows, for example, users to monitor real-time telemetry data on one or more viewing surfaces that can be sized and placed anywhere within three dimensional space of the client communications interface. That data component may also provide software to interface with telemetry data from local or remote sources.

In particular embodiments, the video system component is a multi-channel video monitoring/interfacing component that allows, for example, users to monitor one or more video surfaces that can be sized and placed anywhere in three dimensional space created in the client communications interface. Such component, in certain embodiments, provides software to interface with remote video sources.

In some embodiments, the data component comprises control surfaces that allow, for example, users to control both physical and soft systems in the client communication interface (e.g., in the virtual reality and augmented reality session that is generated), including communications, lighting, audio switchers and mixing consoles, machine/automation control, and more. In particular embodiments, such component support industry standard protocols for controlling smart systems via web based applications and also make the control APIs available to third parties.

In further embodiments, the data component provides three-dimensional (3D) White boarding, which enables users, for example to mark-up, write, capture notes, and draw, in collaboration with others, in three dimensional space in the client communications interface.

In some embodiments, the data component (e.g., that provides non-audio data) provides a geo-positioning (e.g., 2D or 3D) and mapping component. In particular embodiments, the systems and methods herein collect geo-position data (e.g., 2D or 3D geo-positioning data) from one or more users (e.g., users in the field) and then display such data as part of the conferencing systems described herein.

In certain embodiments, the audio/visual ambience component allows, for example, users to be able to upload images and sounds, stream video, and select from a repository of audio and visual content that become the basis of the "backdrop" of their virtual and/or augmented experiences in the client communications interface. Ambience may include, for example, one or more live cameras and microphones placed in a physical control room to enhance the feeling of "being there" for remote operators using only VR or AR headsets. This is especially useful in limited space control rooms such as video trucks and aircraft testing mobile units, and also suitable for remote training and instructional classes.

In further embodiments, the Geo-positioning (e.g., 2D or 3D) and mapping component allows, for example, the use of Google Earth (or similar program) in VR, which allows users to walk through any location on earth in 3D virtual and/or augmented reality space with voice and/or audio monitor channels tied to the geo position of each user, both in VR and in the "real world", and appearing on the map. Users are able to activate talk/listen paths by "gazing" at a location/selector and patch channels by drawing an actual line between two or more. In command and control applications, central command has an actual bird's eye view of all their assets and is able to better coordinate and communicate in real-time.

In certain embodiments, the above mentioned components can be adjusted and placed by users into the desired location within 3D, virtual and/or augmented reality space of the generated client communications interface. Moreover, users have the ability to select certain components in AR or VR only, to better experience their physical environments.

EXEMPLARY APPLICATIONS

Provided below are a number of exemplary applications of the systems and methods.
1. VR Stock Exchange Using the SaaS platform software that generates the client communications interface, in communications with the various components, a stock exchange can be created in VR in the client communications interface. In this application, one can extend a stock exchange with a physical presence, such as the NYSE, to traders in different geographic locations. In certain embodiments, a purely virtual and/or augmented stock exchange could be created as well with no physical presence. The customer may be a bank (e.g., major) bank that wants to provide it's one many traders (e.g., one thousand traders) located around the world an "on floor" trading experience.

For example, to begin, the customer creates an account online from the hosting website (see, e.g., FIG. 1). The system administrator can then login to a private and secure web-based utility that enables the creation of custom virtual and/or augmented reality experiences. To set-up a virtual and/or augmented stock exchange the administrator selects a menu option to create a new experience and name it appropriately. The administrator then designates, for example, one thousand users, pricing is calculated, and the customer agrees to the fees, billed monthly until discontinued. The administrator can then import or input user information and contact information and later in the process send out invites. Note, all users may or may not be assigned to the same virtual and/or augmented experience(s) set up by the administrator and within each virtual and/or augmented experience of the client communications interface, may or may not be assigned all components. In this fashion the administrator can determine, based on criteria such as job function and rank, which experiences and components are appropriate or needed on a per user basis. The administrator is then presented with a menu of components that can be used to create the desired experience. Initial components include, for example, and can be listed as: "Add Comms", "Add Data Feed", "Add Video", "Add Control Surface", "Add White Boarding", and "Add Audio/Video Ambience."

The administrator first selects "Add Comms" to create non-blocking, always-on conferencing channels ("Hoots"), used by traders to facilitate buying and selling of stocks. One or more Hoots may be set up, named, and assigned to various users. The administrator may also interface to existing Hoots via SIP or four-wire audio interface. Also using the "Add Comms" option the administrator may set up one or more communications channels to stream live financial news for traders to monitor. These sources may be interfaced via four-wire audio, SIP, or chosen from online Internet news audio sources. Once created the Hoots can be displayed in different shapes, sizes, and color combinations and moved in virtual and/or augmented reality space by users.

Next the administrator selects "Add Data" to add real-time trader metrics to the client communications interface, either interfaced from the source at the physical exchange, through a service such a Bloomberg, or from another third party. In this example, it is assumed that the bank has an existing real-time data feed from the exchange. The generated client communication interface provides a number of tools, options, and APIs to enable users to interface real-time data streams and bring them into the VR domain. Once the telemetry data feed is set-up, named, and saved, it can be assigned to one or more users. The data feed appears in virtual and/or augmented reality space to users as a screen that can be sized and moved to the desired location.

Next the administrator selects "Add Video" to add a live financial news TV channel. As with the other components, source options and strategies for acquisition vary. In this example the source is cable TV and the feed acquired via a video card on a client side PC running software that acquires the feed and brings it into the VR client communications interface for distribution to users. When users enter the virtual and/or augmented reality experience, the video feed appears as a screen that can be sized and moved around in virtual and/or augmented space to the desired location.

Next the administrator selects "Add Ambience" and chooses from a library of high resolution 360 photos to simulate a stock exchange, or upload a 360 photo of their own, perhaps taken from an actual stock exchange. A previously recorded, looping 360 video can also be used, or a 360 live stream. When users enter the VR experience of the client communications interface, the backdrop appears as the created world around them.

Once all required components are created the administrator can test the VR experience, select to "Go Live", and send out invites via email or text to assigned users.
2. VR Rocket Launch Using the SaaS platform software and system architecture (e.g., FIG. 1), a rocket launch control room can be created in VR as the client communications interface. In this application one can extend a rocket launch control room with a physical presence to remote participants. Note, a "stand alone" virtual control room (client interface) with no physical presence can be created around this application as well, or most other applications. Training, simulation, design, and education purposes are possible applications for purely virtual control room experiences, as well as production applications that do not require a physical presence.

To begin, the customer creates an account online from a hosting website that provides the SaaS software for generating the client communications interface. The system administrator can then login to a private and secure web-based utility that enables the creation of custom virtual reality experiences. To set-up a virtual rocket launch control room the administrator selects a menu option to create a new experience and name it appropriately. The administrator then designates the number of users that require access to the experience, pricing is calculated, and the customer agrees to the fees, billed monthly until discontinued. The administrator can then import or input user information and contact information and later in the process send out invites. Note, all users may or may not be assigned to the same virtual experience(s) set up by the administrator and within each virtual experience, may or may not be assigned all components. In this fashion the administrator can determine, based on criteria such as job function and rank, which experiences and components are appropriate or needed on a per user basis. The administrator is then presented with a menu of components that can be used to create the desired experience in the client communications interface. Initial components could include and can be listed as: "Add Comms", "Add Data Feed", "Add Video", "Add Control Surface", "Add White Boarding", and "Audio/Video Ambience."

The administrator first selects "Add Comms" to create non-blocking, always-on conferencing channels used by launch personnel to facilitate rocket launches. One or more channels may be set up, named, and assigned to various users. The administrator may also interface to existing communications systems via SIP or four-wire audio interface. Also using the "Add Comms" option the administrator may set up one or more communications channels to live stream audio monitor sources, such as weather reports. These sources may be interfaced via four-wire audio, SIP, or chosen from online Internet news/audio sources. Once created the channels can be displayed in different shapes, sizes, and color combinations and moved in virtual reality space by users. The channels can also be associated with images and objects in virtual reality space.

Next the administrator selects "Add Data" to add one or more real-time telemetry feeds, interfaced from the source at the physical rocket launch facility. The client communications interface generating software provides a number of tools, options, and APIs to enable users to interface real-time data streams and bring them into the VR domain. Once the telemetry data feed is set-up, named, and saved, it can be assigned to one or more users. The data feed appears in VR space to users as a screen that can be sized and moved to the desired location.

Next the administrator selects "Add Video" to add one or more live video monitoring feeds showing certain views of the rocket. As with the other components, source options and strategies for acquisition vary. In this example the source is cameras places at the physical launch site and the feed is acquired via a video card on a client side PC running software from VR Control Rooms. The software acquires the feed(s) and brings it into the hosting server for distribution to users via the client communications interface. When users enter the virtual reality experience, the video feed(s) appears as screens that can be sized and moved around in virtual space to the desired location.

Next the administrator selects "Add Control Surface" to allow control of both physical and soft systems used in rocket launches while in VR in the client communications interface. In this application lighting, audio switching, and machine/automation controls are set up and appear as UI surfaces in VR that can be sized and moved around in 3D space.

Next the administrator selects "Add Ambience" and chooses from a library of high resolution 360 photos, or uploads a 360 photo of their own, perhaps taken from the actual rocket launch site. A previously recorded, looping 360 video can also be used, or a 360 live stream. When users enter the VR experience, the ambience selected appears as the backdrop of the virtually created world around them.

Once all required components are created the administrator can test the VR experience, select to "Go Live", and send out invites via email or text to assigned users.

3. VR TV Broadcast Truck

Using the SaaS platform software for generating a client communications interface, a television remote truck (OB Van) control room can be created in VR and/or augmented reality. In this application, one can extend a live television event control room with a physical presence to remote participants.

To begin, the customer creates an account online from the hosting website. The system administrator can then login to a private and secure web-based utility that enables the creation of custom virtual and/or augmented reality experiences. To set-up a virtual and/or augmented television control room the administrator selects a menu option to create a new experience and name it appropriately. The administrator then designates the number of users that require access to the experience, pricing would be calculated, and the customer would agree to the fees, billed monthly until discontinued. The administrator can then import or input user information and contact information and later in the process send out invites. Note, all users may or may not be assigned to the same virtual and/or augmented experience(s) set up by the administrator and within each virtual and/or augmented experience, may or may not be assigned all components. In this fashion the administrator can determine, based on criteria such as job function and rank, which experiences and components are appropriate and needed on a per user basis. The administrator is then presented with a menu of components that can be used to create the desired experience. Initial components include and can be listed as: "Add Comms", "Add Data Feed", "Add Video", "Add Control Surface", "Add White Boarding", and "Audio/Video Ambience."

The administrator first selects "Add Comms" to create non-blocking, always-on conferencing channels used by production personnel to facilitate television productions. One or more channels may be set up, named, and assigned to various users. The administrator may also interface to existing communications systems via SIP or four-wire audio interface. Also using the "Add Comms" option the administrator may set up one or more monitor channels to live stream program audio sources. These sources may be interfaced via four-wire audio or SIP. Once the channels are created, talk/listen selector images can be displayed in different shapes, sizes, and color combinations and moved in virtual and/or augmented reality space by users. The channels can also be associated with images and objects in VR space.

Next the administrator selects "Add Video" to add one or more live video monitoring feeds showing various views of the production location. As with the other components, source options and strategies for acquisition vary. In this example the source is cameras placed at the physical production site and the feed is acquired via a video card on a client-side PC running software from the hosting software company. The software acquires the feed(s) and brings it into the hosting server for distribution to users via the client communications interface. When users enter the VR experience, the video feed(s) appear as screens that can be sized and moved around in 3D VR space to the desired location.

Next the administrator selects "Add Control Surface" to allow control of both physical and soft systems used in television production while in VR. In this application lighting, audio switching, video switching, graphics control, and machine/automation controls are set up and appear as UI surfaces in VR that can be sized and moved around in 3D space.

Next the administrator selects "Add Ambience" and chooses from a library of high resolution 360 photos, or uploads a 360 photo of their own, perhaps taken from the actual production site as well as the truck control room. A previously recorded, looping 360 video can also be used, or a 360 live stream. When users enter the VR experience (or augmented reality experience), the ambience selected appears as the backdrop of the virtually created world around them.

Once all required components are created the administrator can test the VR experience, select to "Go Live", and send out invites via email or text to assigned users.

4. VR Trainer

Many possibilities exist to create VR experiences outside mission critical control rooms with the SaaS client communications interface generating platform. One such application extends to athletic training, coaching, and teaching. Using such a platform, especially its interfacing capabilities to the "real world", a trainer can be brought to students participating within VR. The A/V ambience feature is used to bring a live stream of a trainer and associated real world background into VR. In this manner the students feels like they are in the same physical room as the trainer. The matrix communications platform is used so that the trainer can communicate in real-time with one or more students, simultaneously.

We claim:

1. A conferencing system for facilitating enhanced communication between users, the conferencing system comprising: a communication interface configured to, during a conference session, provide a virtual and/or augmented conference between multiple users having access to a multi-channel, multi-access, always-on, and non-blocking communication.

2. The system of claim 1, wherein said communication interface is in communication with a video component that provides video to one or more of said users.

3. The system of claim 1, wherein said communication interface is in communication with a data component that provides non-audio data to one or more of said users.

4. The system of claim 3, wherein said data component comprises a geo-positioning and mapping component.

5. The system of claim 4, wherein said geo-positioning and mapping component is configured to collect geo-position data from one or more users.

6. The system of claim 1, wherein said communication interface is in communication with an audio/video ambience component that provides audio/video to one or more of said users.

7. The system of claim 1, wherein said communication interface is in communication with a whiteboard component that provides a whiteboard function to one or more of said users.

8. The system of claim 1, further comprising wherein said communication interface is generated by centrally hosted Saas software.

9. The system of claim 1, wherein said communication interface is in communication with an audio analysis component that analyzes incoming human speech audio data for: i) substantive content and/or 2) human emotion content.

10. The system of claim 9, wherein said audio analysis component comprises artificial intelligence software and/or machine learning software.

11. The system of claim 9, wherein said substantive content comprises situational context, wherein said situational context comprises at least one situation selected from the group consisting of: a medical emergency, a product or service complaint, a financial inquiry, a product or service order, a product or service review, a credit card inquiry, and a request to display a whiteboard.

12. The system of claim 9, wherein said human emotion content comprises at least one human emotion selected from the group consisting of: distress, pain, anger, frustration, happiness, satisfaction, annoyance, and panicking.

13. A non-transitory computer readable storage media having instructions stored thereon that, when executed by a conferencing system, direct the conferencing system to perform a method for facilitating enhanced communication between users, the method comprising: during a conference session, providing a virtual and/or augmented conference with multi-channel, multi-access, always-on, and non-blocking communication between a plurality of users.

14. A system for generating a client communication interface for a conference session comprising:
   a) a computer processor, and
   b) non-transitory computer memory comprising one or more computer programs and a database, wherein said one or more computer programs comprises virtual and/or augmented reality client communication interface software, and
   wherein said one or more computer programs, in conjunction with said computer processor, is/are configured to generate a client communication interface for a conference session with a plurality of users by sending and receiving information from the following first components:
      i) a com system component, wherein said com system component is configured to, during a conference session, provide a multi-channel, multi-access, always-on, and non-blocking communication;
      ii) a video system component, wherein said video component provides video to said plurality of users; and
      iii) a data component, wherein said data component provides non-audio data to said plurality of users.

15. The system of claim 14, wherein said one or more computer programs, in conjunction with said computer processor, is/are further configured to generate said client communication interface for a conference session with a plurality of users by sending and receiving information from at least one of the following second components:
   i) audio/video ambience component that provides audio/video to said plurality of users, and
   ii) a whiteboard component that provides a whiteboard function to said plurality of users.

16. The system of claim 14, wherein said virtual and/or augmented reality client communication interface software comprises centrally located SaaS software.

17. The system of claim 16, wherein said SaaS software is hosted on the internet.

18. The system of claim 14, wherein said data component comprises a geo-positioning and mapping component.

19. The system of claim 18, wherein said geo-positioning and mapping component is configured to collect geo-position data from one or more users.

20. The system of claim 14, wherein said communication interface is in communication with an audio analysis component that analyzes incoming human speech audio data for: i) substantive content and/or 2) human emotion content.

* * * * *